I

II

United States Patent Office 3,592,908
Patented July 13, 1971

3,592,908
METHODS FOR TREATING COUGH AND EXPECTORATION WITH α-PINENE OXIDE
Camillo Corvi-Mora, Milan, Italy, assignor to Camillo Corvi S.p.A., Piacenza, Italy
Filed Dec. 4, 1967, Ser. No. 687,643
Claims priority, application Netherlands, Dec. 9, 1966, 6617286
Int. Cl. A61k 27/00
U.S. Cl. 424—278                                3 Claims

ABSTRACT OF THE DISCLOSURE

It was found that the mixture of oxidation products of oil of turpentine owed its analeptic activity to only two substances, being α-pinene oxide, a novel compound, and its hydrolysis product sobrerol. This made possible to formulate new analeptic compositions in exact and reproducible dosages for human and veterinary application. The new compositions having α-pinene oxide and/or sobrerol in pure form as the active principle, are free from untoward side effects known in the practice of using the mixture of oxidation products of oil of turpentine as an active principle. This invention relates to analeptic compositions which are suitable for therapeutic administration, and to their shaped dosage forms such as tablets.

BACKGROUND OF THE INVENTION

Among the products most commonly used in the field of therapy of acute and chronic diseases of the respiratory tract, there are several in which the therapeutcially active compound is a mixture of oxidation products of oil of turpentine. This mixture has drawbacks in that it is difficult to dose in an exact manner and in the fact that its use is accompanied by untoward side effects.

BRIEF SUMMARY OF THE INVENTION

According to the invention, it has been found, that it is only a part of the mixture of oxidation products of oil of turpentine, which is responsible for the analeptic action. The other components appear to possess no activity at all, some of them are highly toxic and others even appear to decrease the analeptic action of the compounds used according to the invention. The compound responsible for this action is α-pinene oxide and/or its hydrolysis product sobrerol.

DETAILED DESCRIPTION

The invention provides an analeptic composition, based on oxidation products of oil of turpentine, which does not possess injurious side effects. The composition according to the invention is characterized in that the substantially pure compound α-pinene oxide and/or sobrerol is used as the active principle. All products which were gas-chromatographically isolated from said mixture of oxidation products were tested pharmacologically and it was found that α-pinene oxide with Formula I of the formula sheet is responsible for the analeptic activity of the mixture. The α-pinene oxide partly rearranges into sobrerol in the presence of water. This α-pinene oxide is present in the oxidation products of oil of turpentine in an amount of less than 2%, and its existence was proved by gas-chromatographic analysis among other components, such as α- and α-pinene, alcohols, ketones and aldehydes of the terpene series, α-pinene oxide possesses the following properties:

| | | | |
|---|---|---|---|
| Freezing point | Below −60° C. | Appearance, | colourless liquid. |
| Boiling point | 65° C. (10 mm. Hg) | Odor, | camphoric. |
| Density | (20° C.) 0.963 | Solubility, | immiscible with water. |
| Refractive index | (20° C.) 1.4697 | | Mixable with methanol, hexane, benzene, chloroform, carbon tetrachloride and acetone. |

Figure 1:
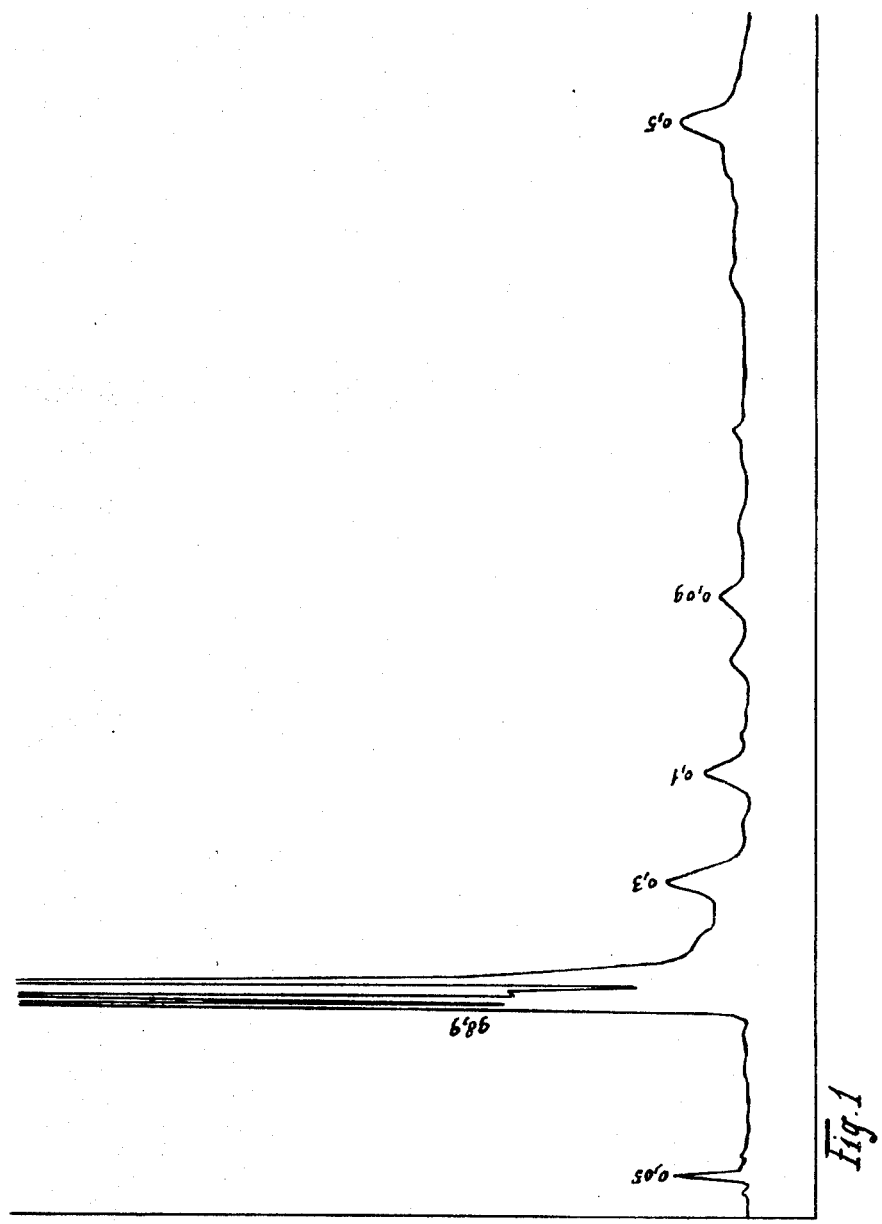
Figure 2:
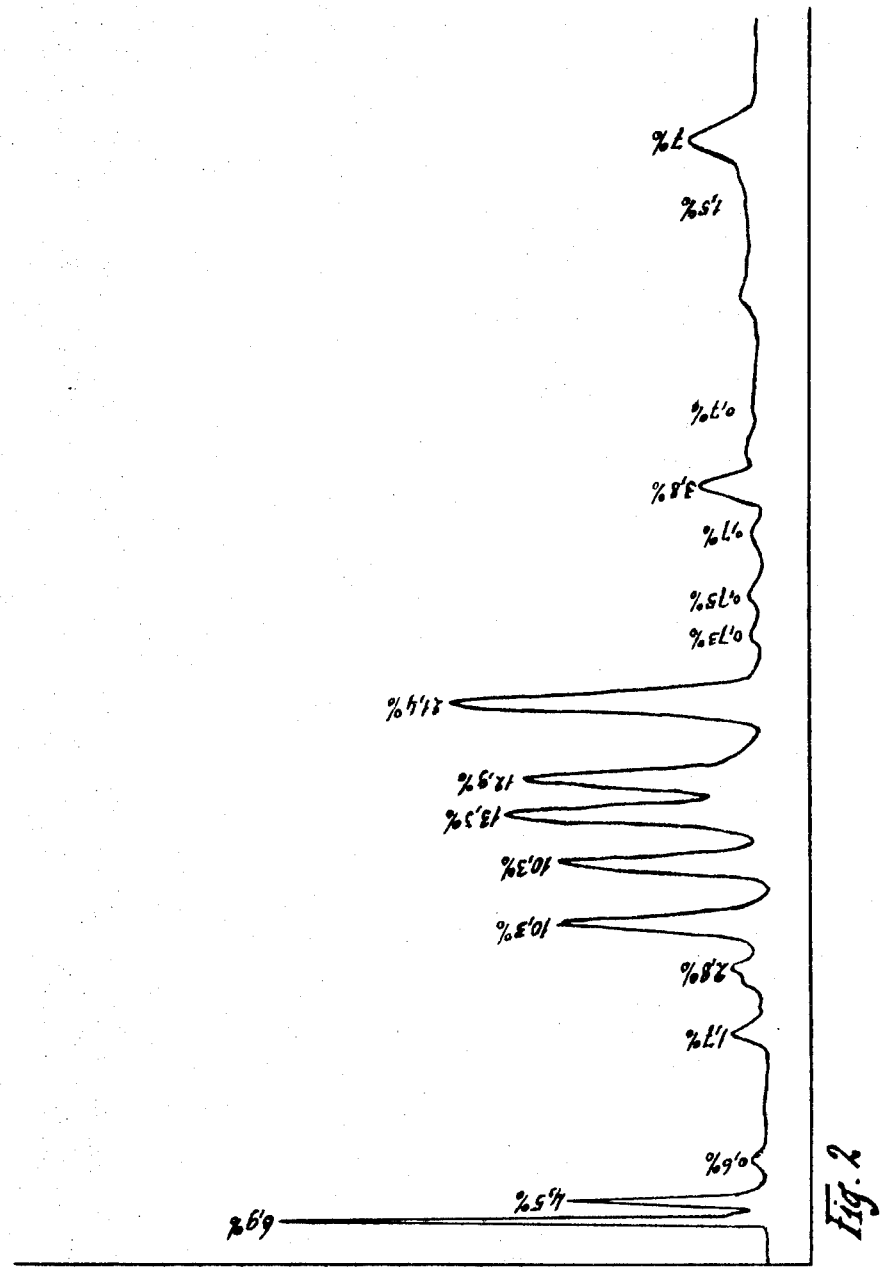
Figure 3:
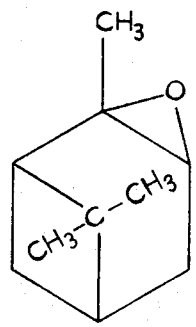
Figure 3:
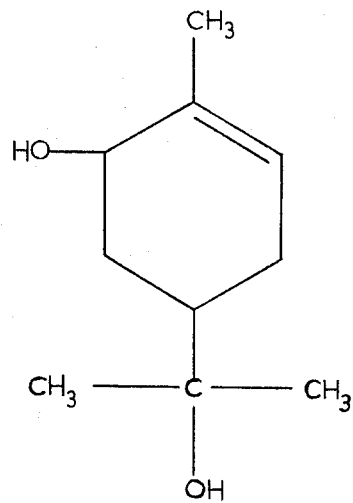

The gas-chromatographic spectrum of α-pinene oxide is reproduced in FIG. 1 of the attached drawings, whereas FIG. 2 of said drawings shows the gas-chromatographic spectrum of a mixture of oxidation products of oil of turpentine, which is comonly used for pharmaceutical applications.

α-Pinene oxide can be dispersed in water by addition of surface active compounds. The hydrolysis product of α-pinene, sobrerol, has the structure of FIG. 3. Its melting point is 150° C. after recrystallization from ethanol and it is a colourless crystalline solid.

The aldehydes and ketones which are present in the oxidation products of oil of turpentine are generally highly toxic and some of these components even undo the pharmacological action of α-pinene oxide and sobrerol.

As a consequence of the discovery that α-pinene oxide, which may be obtained in a relatively pure state, is the active component of the mixture of turpentine oxides, it is now possible to prepare compositions with a known and a reliable dosage. In the past this was generally impossible, since mixtures of natural origin were used in which several components were unknown, while the mixtures after oxidation possessed varying properties.

α-Pinene oxide has the following pharmacological properties:

Toxicity

Tolerated oral dose (rat)—0.6 mg./kg.
Tolerated intraperitoneal dose (rat)—0.06 mg./kg.
Inhalation dose (rat)—9.7 mg./m.$^3$ during one hour.

No mortalities or growth changes of the tested animals have been observed in a test period of 33 days.

α-Pinene oxide has been tested pharmacologically in the pharmaceutical dosage forms such as vials and suppositories, these being in the presence of sobrerol, with following results:

Acute toxicity (method of Carrol S. Weill, "Biometrics," 1952)

The $LD_{50}$ was calculated logarithmically from results obtained with tests on four groups of albino rats with average weights of 250± 21 g. The drug was administered subcutaneously. The results are shown in Table I:

TABLE I

| | Amount | Dose, g./kg. | Mortality rate | F | $LD_{50}$, g./kg. |
|---|---|---|---|---|---|
| Group: | | | | | |
| 1 | 10 | 1 | 0 | | |
| 2 | 10 | 1 | 0 | 1.0 | 5.8 |
| 3 | 10 | 4 | 1/10 | | |
| 4 | 10 | 10 | 6/10 | | |

Chronic toxicity in growing rats

This test was applied for growth variations in young rats just weaned. Two groups of ten rats of uniform weight (approximately 50 grams) were fed on a uniform synthetic integrated diet. In the diet of the first group a sufficient amount of α-pinene oxide was incorporated in order to let each rat consume a daily dose of 0.6 g./kg.

The rats were weighed before the first treatment and then subsequently every second week again. The whole test lasted two months. Tables II and III show, that the growth rate of rats is not influenced by α-pinene oxide.

TABLE II.—WEIGHTS OF RATS FED ON A DIET WITH α-PINENE OXIDE

| | Initial weight | Weight after— | | | |
|---|---|---|---|---|---|
| | | 2 weeks | 4 weeks | 6 weeks | 8 weeks |
| Rat Number: | | | | | |
| 1 | 45 | 68 | 110 | 125 | 152 |
| 2 | 51 | 70 | 101 | 120 | 160 |
| 3 | 53 | 69 | 105 | 136 | 148 |
| 4 | 47 | 76 | 108 | 130 | 162 |
| 5 | 56 | 71 | 120 | 132 | 149 |
| 6 | 52 | 64 | 102 | 127 | 159 |
| 7 | 48 | 74 | 115 | 147 | 154 |
| 8 | 50 | 77 | 105 | 125 | 144 |
| 9 | 51 | 70 | 103 | 131 | 161 |
| 10 | 52 | 68 | 106 | 130 | 155 |
| Average | 50±3 | 70±4 | 107±6 | 129±5 | 154±6 |

TABLE III.—WEIGHTS OF RATS FED ON A DIET WITHOUT THE α-PINENE OXIDE

| | Initial weight | Weight after— | | | |
|---|---|---|---|---|---|
| | | 2 weeks | 4 weeks | 6 weeks | 8 weeks |
| Rat Number: | | | | | |
| 1 | 54 | 70 | 105 | 130 | 150 |
| 2 | 49 | 65 | 115 | 141 | 160 |
| 3 | 47 | 73 | 103 | 145 | 142 |
| 4 | 53 | 75 | 100 | 128 | 145 |
| 5 | 57 | 80 | 110 | 125 | 155 |
| 6 | 49 | 69 | 122 | 139 | 148 |
| 7 | 54 | 62 | 108 | 135 | 139 |
| 8 | 45 | 65 | 102 | 127 | 143 |
| 9 | 50 | 75 | 116 | 136 | 144 |
| 10 | 54 | 68 | 108 | 127 | 147 |
| Average | 50±4 | 70±5 | 108±7 | 133±7 | 147±6 |

Chronic toxicity in adult rats

This test was carried out on 15 albino rats of average weight of 105±19 g., which were maintained throughout the test period in a standard condition of feeding and stabling. Each of the rats received a daily subcutaneous dose of 0.6 g./kg. of α-pinene oxide.

After 40 days, the rats were killed by section of the carotis in a light ethereal anaesthesia. The following organs were immediately inspected: liver, stomach, intestines, lung, heart, kidney, suprarenal capsules, thyroid and gonads. From fragments of these organs, fixed in formaline and Bouin, histological sections were prepared for colouration with hematoxylic-eosin, Sudan-III and Mallory. A microscopic examination showed no modification from the normal histological structure.

Influence on blood-circulation

This test was carried out with 6 adult albino rats of an average weight of 176 g. The pressure and the heart-beat frequency were evaluated before treatment, and after daily administration of a dose of 0.6 g./kg. α-pinene oxide. The whole test lasted one month, and evaluations were made every ten days. These values were taken from the tail's artery using photoelectric apparatus and a manometer, allowing determination of heart-beat frequency and blood pressure, respectively. Table IV shows, that the normal blood-circulation is not influenced by α-pinene oxide.

TABLE IV

| | Pressure and frequency before treatment | | Pressure and frequency as function of treatment time with α-pinene oxide | | | | | |
|---|---|---|---|---|---|---|---|---|
| | | | 10th day | | 20th day | | 30th day | |
| | Pr. | Fr. | Pr. | Fr. | Pr. | Fr. | Pr. | Fr. |
| Rat Number: | | | | | | | | |
| 1 | 110 | 340 | 105 | 350 | 110 | 355 | 105 | 370 |
| 2 | 115 | 370 | 105 | 360 | 120 | 350 | 120 | 360 |
| 3 | 105 | 360 | 110 | 370 | 115 | 370 | 90 | 350 |
| 4 | 90 | 350 | 85 | 340 | 100 | 360 | 110 | 370 |
| 5 | 100 | 360 | 95 | 360 | 110 | 370 | 115 | 375 |
| 6 | 95 | 375 | 100 | 350 | 90 | 355 | 110 | 350 |
| Average | 100 | 359 | 100 | 355 | 107 | 360 | 108 | 362 |

NOTE:
Pr.=Pressure.
Fr.=Frequency.

Influence on blood

In 4 adult rabbits having average weights of 2.375 kg., the erythrocytes were determinated by means of a Thoma-Zeiss Corpuscles Counting Chamber, after administration of a daily dose corresponding to 0.6 g./kg. of α-pinene oxide. The tests were carried out on blood, taken from the marginal ear vein every 10 days during a month. The following Table V shows that α-pinene oxide does not impede the functionality of the haemopoietic apparatus.

TABLE V

| | Amount of erythrocytes before treatment ($\times 10^5$) | Amount of erythrocytes after treatment ($\times 10^5$)— | | |
|---|---|---|---|---|
| | | 10th day | 20th day | 30th day |
| Rabbit Number: | | | | |
| 1 | 45 | 48 | 50 | 49 |
| 2 | 47 | 50 | 47 | 50 |
| 3 | 50 | 48 | 49 | 49 |
| 4 | 49 | 51 | 50 | 51 |

The invention is illustrated by the following examples.

EXAMPLE I

Action on bronchial tree

Three groups of 10 guinea-pigs were tested. The animals of the first group were used as controls, and received no treatment of any kind. The second group of animals received a parenterally administered dose of 0.3 g./kg. of α-pinene oxide, and the third group received a rectally administered dose of 0.6 g./kg. of α-pinene oxide two hours before start of the experiment.

All groups were submitted to contemporaneous exposition of ammonia vapors in aerosol form in an air-tight container for three minutes. The aerosol was obtained from a 0.5 N aqueous ammonium-hydroxide solution.

The results show, that α-pinene oxide has an intensely depressing activity on bronchospasm and irritation. The following Table VI shows the average number of cough attacks in animals treated with the product as compared with the average number of attacks in the controls.

TABLE VI

Effects of administration of α-pinene oxide on the frequency of cough attacks of guinea-pigs treated with an N/2 ammonia aerosol during 3 minutes

| Animal Number | Controls, Group I | | Group II (parenteral) | | Group III (rectal) | |
|---|---|---|---|---|---|---|
| | Weight | Number of cough attacks | Weight | Number of cough attacks | Weight | Number of cough attacks |
| 1 | 390 | 14 | 380 | 2 | 375 | 3 |
| 2 | 350 | 8 | 345 | 6 | 350 | 5 |
| 3 | 410 | 10 | 400 | 5 | 380 | 2 |
| 4 | 385 | 12 | 390 | 4 | 400 | 7 |
| 5 | 405 | 9 | 340 | 1 | 410 | 4 |
| 6 | 365 | 7 | 405 | 2 | 370 | 9 |
| 7 | 335 | 13 | 410 | 3 | 355 | 3 |
| 8 | 320 | 15 | 370 | 8 | 395 | 2 |
| 9 | 450 | 10 | 385 | 7 | 410 | 8 |
| 10 | 315 | 8 | 360 | 3 | 360 | 1 |
| Average | 372 | 10 | 378 | 4 | 380 | 4 |

EXAMPLE II

Sedative action on respiratory centre: activity on reflexed stimuli

Six rabbits were incannulated without anesthesia in the trachea and the cannulae connected to a Marey drum. The reflexed stimulus of the respiratory centre was inducted with an endovenous injection of 1 mg./kg. of lobeline in all animals.

Three rabbits served as controls, without further treatment, but the other three received a subcutaneously administered dose of 0.3 g./kg. of α-pinene oxide 1 hour before the lobeline injection. The results show that α-pinene oxide partially impedes the increase of respiratory deviation and the increase of frequency, induced by the lobeline injection.

EXAMPLE III

Activity on direct stimulus

The same test was conducted as in Example II, with the difference, that the stimulus of the respiratory centre was inducted with a dose of 0.5 mg./kg. of strychnine nitrate. The α-pinene oxide does not show any influence in this test.

EXAMPLE IV

Activity on direct stimulus

The same test was conducted as in Example II except that the stimulus of the respiratory centre was obtained by a $CO_2$ inhalation for a period of 60 seconds. The increase of the respiratory deviation inducted by $CO_2$ was impeded by α-pinene oxide.

The action of α-pinene oxide has also been observed in clinical tests on patients suffering from pulmonary tuberculosis, silicosis, bronchial asthma, emphysema, bronchiectasis, and acute and chronic bronchitis. The patients suffering from respiratory insufficiency were spirographically tested at the beginning and at the end of therapy in order to evaluate possible modifications. The subjective variation of the symptoms cough and expectoration was followed in all the patients, who were treated for several months. Thereafter, the variation of symptom dyspnoe was observed. Attention was paid to the possibility of cases of intolerance. The results and conclusions of the experiments are the following:

(1) α-Pinene oxide has proved to be highly therapeutically effective in constantly decreasing the symptom cough. In most cases expectoration was reduced and fluidified.

(2) Spirographic tests on patients affected by respiratory insufficiency at the end of the treatment a steady increase of the indexes and particularly of vital capacity and of maximum ventilation per minute.

A marked increase has been observed of the volume per minute, of the VEMS/CV and of the oxygen consumption per minute. This favourable modification of the spirographic indexes can be attributed to the analeptic action of α-pinene oxide, and is illustrated by the following table:

TABLE VII

Variations of spirographic indexes after treatment with α-pinene oxide

| | | | Percent | | |
|---|---|---|---|---|---|
| Patient Number | Vol./min. | Vital capacity | modification of— Ventilation, mass/min. | VEMS/CV | $O_2$ consumption/min. |
| 1 | +10 | +15 | +15 | +10 | +10 |
| 2 | +5 | +15 | +15 | +10 | +0 |
| 3 | +10 | +15 | +20 | | +5 |
| 4 | +10 | +20 | +20 | +5 | +15 |
| 5 | +5 | +15 | +20 | +5 | |
| 6 | +5 | +10 | +15 | | |
| 7 | | +10 | +10 | +5 | +5 |
| 8 | +5 | +10 | +15 | | +5 |
| 9 | +5 | +15 | +20 | +5 | |
| 10 | | +10 | +15 | | |
| 11 | +5 | +10 | +25 | +5 | +5 |
| 12 | | +10 | +10 | +10 | |
| 13 | | +10 | +10 | | |
| 14 | +10 | +15 | +15 | | +5 |
| 15 | +5 | +10 | +20 | +5 | |
| 16 | | +15 | +5 | | |
| 17 | +5 | +15 | +25 | +10 | +5 |
| 18 | | +5 | +10 | +15 | |
| 19 | +10 | | +5 | +5 | +10 |
| 20 | +10 | +15 | +25 | +10 | +10 |

(3) Even when used in a prolonged treatment, α-pinene oxide showed no undesirable side effects or intolerance.

The following examples illustrate the action of α-pinene oxide on human beings.

EXAMPLE V

A man, having an age of 69 years, was affected by left tubercular fibrothorax, accompanied by symptoms as cough and expectoration. The patient has diffused rhonchi. For 20 days, a daily dose of one vial and one suppository was administered. A decrease of cough and expectoration, and a decrease of the objective symptoms were observed. No side effects were found.

EXAMPLE VI

A woman, having an age of 61 years, was affected by left superior lobal tubercular cavity, associated with chronic bronchitis, accompanied by coughs, abundant expertoration and dispnoe. For 10 days, a daily dose of 1 vial and 1 suppository was administered. A substantial decrease of cough and expectoration was observed, and no side effects were found.

EXAMPLE VII

A woman, having an age of 37 years, suffered from chronic tuberculosis miliaris pulmonum at the upper right lobe, accompanied by cough and abundant expectoration. For ten days, a dose of one vial per day was administered. A substantial decrease of cough, and a fluidification of expectoration were observed, and no side effects were found.

EXAMPLE VIII

A woman, having an age of 64 years, was affected by left basal broncho-pneumonia with chronic bronchitis and myocardium sclerosis. This patient had cough and produced an abundant yellowish expectoration; objectively she showed presence of severe hypophonesis and rhonchi at the left base. For ten days a daily dose of two suppositories was administered. The symptoms indicated a substantial regression, and no side effects were observed.

I claim:

1. A method comprising administering a therapeutically effective amount of $\alpha$-pinene oxide to a patient afflicted with coughing and expectoration.

2. A method as claimed in claim 1 wherein the therapeutically effective amount is 0.6 mg./kg. daily and same is administered orally.

3. A method as claimed in claim 1 wherein the therapeutically effective amount is 0.06 mg./kg. daily and same is administered intraperitoneally.

References Cited

U.S. Patent Office, Class Definitions—Class 424, June 28, 1968, pp. 2–3.

Chem Abst., vol. 58, col 7272h—7273a (1963).

Chem Abst., Subject Index, vol. 58, pp. 1711–1712 (1963).

ALBERT T. MEYERS, Primary Examiner

S. J. FRIEDMAN, Assistant Examiner